United States Patent

[11] 3,593,505

| [72] | Inventor | Robert A. Mittelstadt |
| | | Burnsville, Minn. |
| [21] | Appl. No. | 757,328 |
| [22] | Filed | Sept. 4, 1968 |
| [45] | Patented | July 20, 1971 |
| [73] | Assignee | Toro Manufacturing Corporation |
| | | Minneapolis, Minn. |

[54] MOWER MOTOR COOLING SYSTEM
15 Claims, 6 Drawing Figs.

[52] U.S. Cl.................................................. 56/12.8,
56/17.5
[51] Int. Cl...................................................... A01d 35/26
[50] Field of Search............................................ 56/25.4;
310/104, 103

[56] References Cited
UNITED STATES PATENTS
3,221,481  12/1965  Mattson et al. ............... 56/25.4
3,417,271  12/1968  Reed ........................... 310/103

Primary Examiner—Robert Peshock
Attorneys—Vernon A. Johnson and Thomas A. Lennon ABSTRACT: A cooling system for the electric motor of an electric rotary mower. The system includes a fan which is mounted on the mower shaft under the deck of the housing so as to be enclosed in said housing together with the cutter blade which is also mounted on the motor shaft. The fan draws cooling atmospheric air into the upper end portion of the motor and downwardly through the motor into the blade housing.

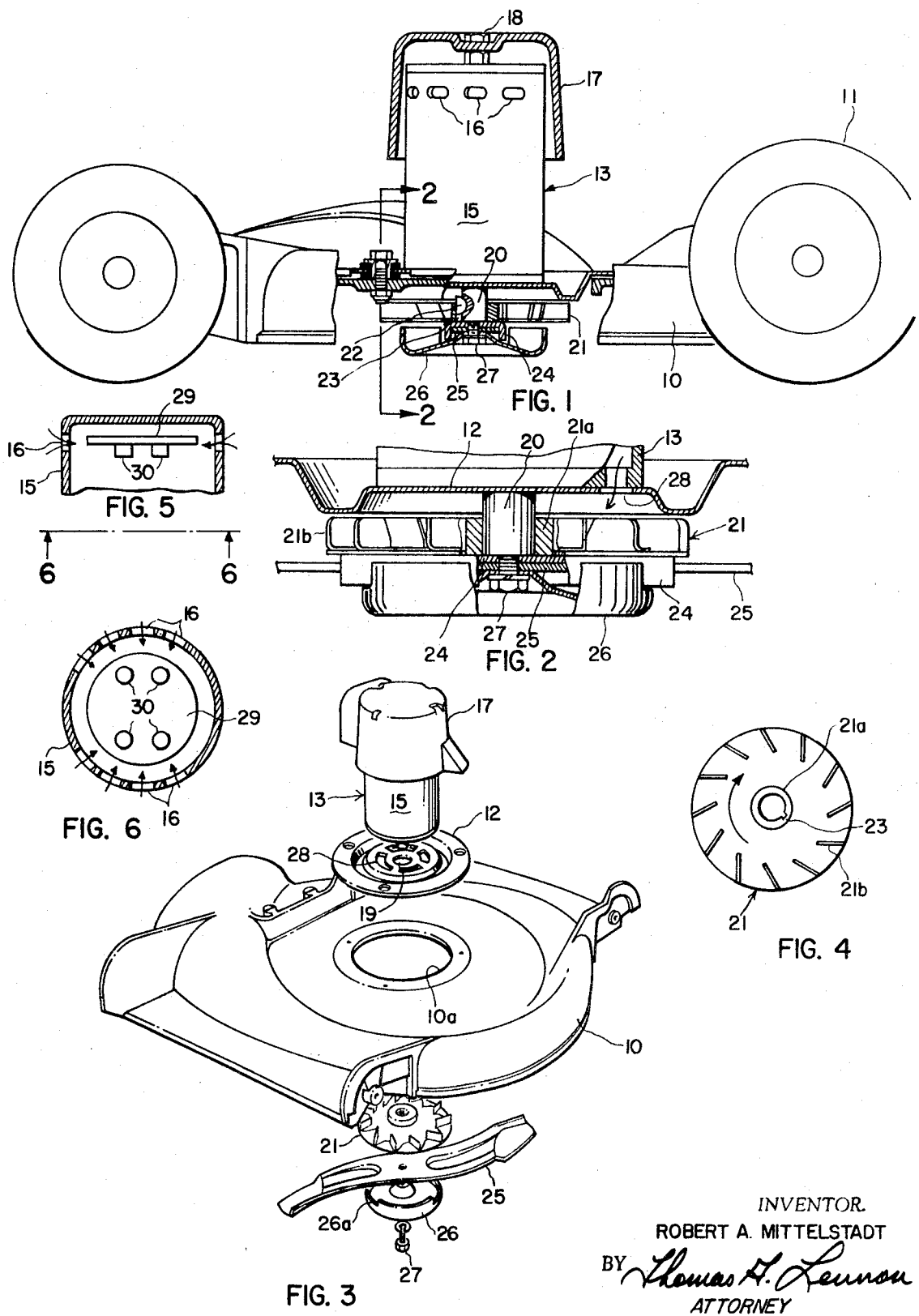

MOWER MOTOR COOLING SYSTEM

In conventional electric mowers, the fan for motor cooling system is located within the motor casing and above the housing for the cutter blade, on which housing the electric motor is mounted whereby the air after having traversed the motor is discharged back to the atmosphere above the housing and immediately adjacent the motor, whereby the hot air from the motor is almost immediately returned thereto. This conventional motor is almost immediately returned thereto. This conventional system is not as efficient as it should be and the location of the fan above the deck has certain design disadvantages.

Therefore, it is an object of this invention to provide an improved cooling system for electric rotary mowers.

Another object is to provide an improved motor cooling system which also improves the structural design of the mower.

These and other objects will become apparent from the following description and drawings accompanying same in which:

FIG. 1 is a side elevational view with portions broken away of an electric rotary mower embodying the improved cooling system of this invention:

FIG. 2 is a front elevational view taken along the lines 2-2 of Figure 1, with portions broken away:

FIG. 3 is an exploded view of the portions of the mower illustrated in FIGURE 1 and 2 relating to the cooling system of this invention:

FIG. 4 is a top plan view of the fan:

FIG. 5 is a schematic vertical sectional view of a portion of the motor and

FIG. 6 is a schematic horizontal sectional view of a portion of the motor as viewed from below.

Referring to the drawings, the electric rotary mower therein illustrated includes an inverted housing 10 having ground wheels 11 mounted thereon. The top deck has a central opening 10a formed therein, in and over which a motor support plate 12 is mounted so that said plate, in effect, forms part of the top deck of the housing. An electric motor 13 is secured to said plate. The motor extends upwardly from the plate and includes a cylindrical casing 15 which has a circumferential series of openings 16 formed in the upper end thereof for admitting cooling air into the interior of the motor. The cover or shroud 17 is attached to the upper end of the motor by means of fastener 18 and extends downwardly a substantial distance below the air inlet openings 16, with the sidewalls of the shroud being in spaced relationship to the casing 15 to provide a passageway between the shroud and the casing for atmospheric air to reach the openings 16.

The motor shaft 20 extends downwardly from the motor through and opening 19 provided in the center of plate 12 into the interior of the housing 10.

A fan 21 is mounted on the motor shaft by means of a key 22 on the shaft and key way 23 formed in the hub 21a of the fan. An inverted channel 24 is secured to and depends from the base of the fan and forms a part of the fan assembly. A horizontal cutter blade 25 is seated in the channel 24 and the sides of the blade are engaged by the side of the channel to provide a direct driving relationship between the blade and the fan. An antiscalp disc 26 is located beneath the blade and the disc, blade and fan assembly are secured to the motor shaft by means of a screw fastener 27 which is coaxially threaded into the outer end of the motor shaft. The disc 26 has diametrically opposed slots 26a formed in the upstanding sidewalls thereof for receiving the blade 25.

It will be noted that the fan blades 21b are radially offset and have backward sweep with respect to the direction of rotation. This backward sweep of the fan blades prevents the grass clippings from collecting thereon and clogging same. Fan blades having a radial orientation can also be used.

The motor casing is open at the bottom to permit the cooling air to be discharged downwardly from the bottom thereof.

To enable said air to be discharged into the housing 10 under the top desk thereof, four arcuate slots 28 are formed in the plate 12 and located directly underneath the motor and in communication with the interior thereof, whereby the air is discharged from the motor through said slots and into the housing 10.

One preferred embodiment of this invention utilizes a silicon rectified permanent magnet motor. As part of the improved cooling system of this invention, the diodes are located directly in the path of travel of the cooling air, and preferably within the motor casing directly opposite the air intake openings, so that the diodes are contacted by the air almost immediately upon its entering the motor casing. This is illustrated schematically in FIG. 5 and 6, wherein a diode supporting plate 29 is shown mounted in the upper end of the motor casing opposite the air intake openings 16. The four diodes 30 are supported by said plate on the underside thereof, and are also located directly opposite the air intake openings 16 in the casing. Thus, as the air is drawn into the casing by the fan 21, it immediately passes over the diodes and their supporting plate, maximizing the cooling thereof.

In operation, when the motor is running, the fan draws cooling air up under the shroud 17 between the shroud and the motor casing 15 and into the openings 16, where the air immediately washes over the diodes 30 and diode plate 29 and cools same. The air then travels downwardly through the motor and emerges from the bottom thereof, being discharged into the blade housing 10 through slots 28 in plate 12.

The location of the fan is in the housing provides for a substantially increased airflow and therefore better cooling of the electric motor than has heretofor been possible. The location of the fan in the housing also improves the bagging characteristics of mowers which are so designed. The cooperative interrelationship of the fan and blade assemblies provides a strong sturdy construction which is easy to assemble and disassemble. Locating the fan in the blade housing also has the advantage that it permits wider variation in fan size to accomplish the degree of cooling necessary for any particular mower and the conditions under which it is intended to operate.

It will, of course, be understood that various changes may be made in the form, details, arrangement and proportions of the various parts without departing from the scope of this invention.

I claim:

1. In a rotary mower:

A housing having a top deck and a skirt depending from the outer periphery of said deck defining a cutting chamber beneath said deck, said chamber being substantially completely open at the bottom, an electric motor mounted on top of said deck, Said deck having an opening therein, said motor having an output shaft extending vertically downwardly through said opening, fan means mounted on said shaft beneath said deck in said chamber, fan means being adapted to draw cooling air past said motor through said opening and into said chamber, generally horizontal rotary cutter blade means supported by said shaft within said chamber, said shaft directly driving at least one of said means, and and means directly drivingly interconnecting said fan and blade means with each other whereby the rotation of one effects rotation of the other.

2. The mower of claim 1 including means forming a part of said fan means and operatable engaging said blade means to provide a driving connection between said fan means and said blade means.

3. The mower of claim 1 including means depending from said fan means and engaging opposite sides of said blade means.

4. The mower of claim 1 including a channel forming an integral part of either said fan means or said blade means, the other of said fan or blade means being seated in said channel and drivingly engaged thereby.

5. The mower of claim 1 including an inverted channel depending from said fan means, said blade means being seated in said channel and drivingly engaged thereby.

6. The mower of claim 1 wherein said fan means is substantially unenclosed within said chamber except for said skirt and said blade means.

7. The mower of claim 1 wherein said fan means includes a plurality of fan blades which are radially offset with respect to said shaft and extend rearwardly with respect to the direction of travel.

8. The mower of claim 1 wherein the diameter of said fan means in substantially greater than the diameter of said motor.

9. The mower of claim 1 wherein said motor includes a casing, and wherein said casing is located entirely above the top deck of said housing.

10. The mower of claim 1 wherein said motor includes a tubular casing,

Said casing being closed by a plate member secured to the top of said deck, said plate having an air discharge opening therein providing communication between the interior of said casing and said cutting chamber, said casing having air inlet openings in the upper end portion thereof for admitting cooling air to the interior of said casing and the motor enclosed thereby, said air discharge openings facing downwardly towards said fan means, said air inlet openings facing laterally outwardly from said casing.

11. The mower of claim 1 wherein said motor includes a tubular casing, air discharge opening providing air communication between the interior of said casing and the interior of said cutting chamber, and air inlet opening means in said casing for admitting atmospheric air to the interior of said casing, and a shroud mounted on said motor and enclosing the upper portion of said motor said shroud depending downwardly below said air inlet openings and spaced from said casing whereby cooling atmospheric air is admitted between said shroud and said casing and travels upwardly to said air inlet openings.

12. The mower of claim 1 wherein said fan means includes a plurality of radially offset blades extending rearwardly with respect to the direction of travel, said blades being mounted on a base element and extending upwardly therefrom, said base element having an inverted channel integrally secured thereto and depending from the underside of said base element, said blade means having an elongate blade member seated in said channel and drivingly engaged thereby.

13. The mower of claim 12 wherein said motor includes a tubular casing, the bottom of said casing being closed by a blade member secured to the top of said deck, said blade member having a plurality of openings formed therein and facing downwardly providing communication between the interior of said casing and said cutting chamber, said casing having a plurality of air inlet openings formed in the upper end portion thereof and facing laterally outwardly therefrom, and a shroud covering the upper end portion of said motor, said shroud extending below said inlet openings and spaced from said casing whereby atmospheric air passes upwardly between said shroud and casing before entering said inlet openings.

14. The mower of claim 1 wherein said motor includes a tubular casing having air inlet openings at the upper end thereof and air discharge openings at the lower end thereof whereby said fan means draws cooling air from the atmosphere immediately adjacent said motor into said casing through said air inlet openings and downwardly interiorally of said casing and through said air discharge openings and then discharges said air radially directly into said cutting chamber whereby said cooling air does not pass through another enclosure from the time it is engaged by said fan until it enters said cutting chamber.

15. In a rotary mower:

a housing having a top deck and a skirt depending from the outer periphery of said deck defining a cutting chamber beneath said deck, an electric motor including a tubular casing mounted on said deck, said casing being disposed entirely above said deck, said motor including a vertical output shaft extended downwardly into said cutting chamber, a fan and a rotary cutter blade mounted on said shaft in said cutting chamber, a plate member enclosing the bottom of said casing and secured to said motor casing, and fastening means securing said plate member to said deck whereby said plate serves as the means for attaching said motor to said housing, said plate member having a downwardly facing air discharge opening formed therein providing communication between the interior of said casing and the interior of said cutting chamber, said casing having an air inlet opening formed in the upper end portion thereof and facing laterally outwardly for admitting cooling air to the interior of said casing, and a shroud covering the upper end portion of said motor, said shroud extending below said inlet opening and whereby said cooling atmospheric air is admitted between said shroud and said casing upwardly before entering said inlet opening.